United States Patent
Nguyen et al.

(10) Patent No.: US 10,988,683 B2
(45) Date of Patent: Apr. 27, 2021

(54) PROPPANT TREATMENTS FOR MITIGATING EROSION OF EQUIPMENT IN SUBTERRANEAN FRACTURING OPERATIONS

(71) Applicant: Halliburton Energy Services, Inc., Houston, TX (US)

(72) Inventors: Philip D. Nguyen, Houston, TX (US); Janette Cortez Montalvo, Porter, TX (US); Jun Su An, Houston, TX (US)

(73) Assignee: Halliburton Energy Sendees, Inc., Houston, TX (US)

( * ) Notice: Subject to any disclaimer, the term of this patent is extended or adjusted under 35 U.S.C. 154(b) by 0 days.

(21) Appl. No.: 16/933,346

(22) Filed: Jul. 20, 2020

(65) Prior Publication Data

US 2020/0347288 A1    Nov. 5, 2020

Related U.S. Application Data

(63) Continuation of application No. 16/592,173, filed on Oct. 3, 2019, now Pat. No. 10,752,832, which is a continuation-in-part of application No. PCT/US2018/016490, filed on Feb. 1, 2018.

(51) Int. Cl.
*E21B 43/12* (2006.01)
*E21B 43/26* (2006.01)
*C09K 8/80* (2006.01)

(52) U.S. Cl.
CPC .............. *C09K 8/805* (2013.01); *E21B 43/13* (2020.05); *E21B 43/26* (2013.01)

(58) Field of Classification Search
CPC .......... C09K 8/805; E21B 43/26; E21B 43/13
See application file for complete search history.

(56) References Cited

U.S. PATENT DOCUMENTS

| | | | |
|---|---|---|---|
| 7,968,184 | B2 | 6/2011 | Humphreys et al. |
| 8,118,561 | B2 | 2/2012 | Bruce et al. |
| 9,297,244 | B2 | 3/2016 | Mahoney et al. |
| 9,315,721 | B2 | 4/2016 | Mahoney et al. |

(Continued)

FOREIGN PATENT DOCUMENTS

| | | |
|---|---|---|
| WO | 2017069763 A1 | 4/2017 |
| WO | 2019152042 A1 | 8/2019 |

OTHER PUBLICATIONS

Foreign Communication from Related Application—International Search Report and Written Opinion of the International Searching Authority, International Application No. PCT/US2018/016490, dated Oct. 24, 2018, 13 pages.

*Primary Examiner* — Silvana C Runyan
(74) *Attorney, Agent, or Firm* — Conley Rose, P.C.; Rodney B. Carroll

(57) ABSTRACT

Systems and methods for treating proppant to mitigate erosion of equipment used in certain subterranean fracturing operations are provided. In some embodiments, the methods comprise: conveying a plurality of coated proppant particulates into a blender, wherein the coated proppant particulates comprise at least a partial coating of DFR and/or a hydratable polymer; blending the plurality of coated proppant particulates with an aqueous base fluid in the blender to form a treatment fluid; and introducing the treatment fluid from the blender into at least a portion of a subterranean formation.

20 Claims, 7 Drawing Sheets

(56) References Cited

U.S. PATENT DOCUMENTS

| | | |
|---|---|---|
| 9,644,139 B2 | 5/2017 | Mahoney et al. |
| 10,066,152 B2 | 9/2018 | Lu et al. |
| 2004/0043906 A1 | 3/2004 | Heath et al. |
| 2006/0243441 A1 | 11/2006 | Cornelius de Grood et al. |
| 2008/0264641 A1 | 10/2008 | Slabaugh et al. |
| 2010/0167965 A1 | 7/2010 | Sebastian et al. |
| 2010/0304107 A1 | 12/2010 | Nardi et al. |
| 2013/0233545 A1* | 9/2013 | Mahoney ............... C09K 8/685 166/280.2 |
| 2013/0248191 A1* | 9/2013 | Nguyen ............... C09K 8/685 166/308.1 |
| 2014/0014348 A1 | 1/2014 | Mahoney et al. |
| 2014/0060832 A1 | 3/2014 | Mahoney et al. |
| 2015/0337620 A1 | 11/2015 | Fonseca Ocampos et al. |
| 2017/0058190 A1 | 3/2017 | Soane et al. |
| 2017/0096598 A1 | 4/2017 | Vo et al. |
| 2017/0260445 A1 | 9/2017 | Potisek et al. |
| 2017/0306219 A1* | 10/2017 | Quintero ............... E21B 43/04 |
| 2018/0127645 A1* | 5/2018 | Chopade ............... C09K 8/805 |
| 2018/0320049 A1* | 11/2018 | Shumway ............. E21B 21/062 |
| 2020/0032136 A1 | 1/2020 | Nguyen et al. |

\* cited by examiner

PROPPANT TREATMENTS FOR MITIGATING EROSION OF EQUIPMENT IN SUBTERRANEAN FRACTURING OPERATIONS

CROSS REFERENCE TO RELATED APPLICATIONS

This application is a continuation of and claims priority to U.S. patent application Ser. No. 16/592,173 filed Oct. 3, 2019 and published as U.S. Patent Application Publication No. US 2020/0032136 A1, which is a continuation-in-part of International Application No. PCT/US2018/016490 filed Feb. 1, 2018, published as WO 2019/152042 A1, and both entitled "Proppant Treatments for Mitigating Erosion of Equipment in Subterranean Fracturing Operations," each of which is incorporated by reference herein in its entirety.

BACKGROUND

The present disclosure relates to systems and methods for performing fracturing treatments in certain subterranean formations.

Wells in hydrocarbon-bearing subterranean formations may be stimulated to produce those hydrocarbons using hydraulic fracturing treatments. In hydraulic fracturing treatments, a viscous fluid (e.g., fracturing fluid or pad fluid) is pumped into a subterranean formation at a sufficiently high rate and/or pressure (e.g., above the fracture gradient of the formation) such that one or more fractures are created or enhanced in the formation. These fractures provide conductive channels through which fluids in the formation such as oil and gas may flow to a well bore for production. In order to maintain sufficient conductivity through the fracture, it is often desirable that the formation surfaces within the fracture or "fracture faces" be able to resist deformation and/or particulate migration to prevent the fracture from narrowing or fully closing. Typically, proppant particulates suspended in a portion of the fracturing fluid are also deposited in the fractures when the fracturing fluid is converted to a thin fluid to be returned to the surface. These proppant particulates serve to prevent the fractures from fully closing so that conductive channels are formed through which produced hydrocarbons can flow.

In some conventional fracturing treatments, large amounts of water or other fluids (e.g., an average of 1 million gallons per fracturing stage) are pumped at high rates and pressures in order provide sufficient energy downhole to form fractures in the formation of the desired geometries. To create fractures in certain types of formations (e.g., unconventional formations or low permeability formations) or to create complex fracture network in subterranean formations, operators may rely on the use of a low viscosity fluid (e.g., slickwater fluids) as the main fracturing fluid and small size proppant (e.g., 100-mesh) as the proppant. Large amounts of proppant and fluid are often used in these operations. Providing the large amounts of pumping power, water, proppants, and fluid additives (e.g., friction reducers) for these operations, and the disposal of water flowing back out of the formation after these treatments, are often costly and time-consuming, and make fracturing operations economically impractical in many circumstances.

The pumps and other equipment used in pumping large volumes of low viscosity fracturing fluids carrying large amounts of proppant at high injection rates may make certain portions of that equipment susceptible to damage in the form of erosion, corrosion, wear and tear, and fatigue. Ultimately, such damage can cause rupturing or blowout of fracturing fluid under high pressure as a result of cracking of certain portions of the surface equipment during a hydraulic fracturing treatment. Erosion may decrease efficiencies or otherwise require the pump to be shut down more frequently and repaired or replaced altogether.

BRIEF DESCRIPTION OF THE DRAWINGS

These drawings illustrate certain aspects of some of the embodiments of the present disclosure, and should not be used to limit or define the claims.

Figure 1:
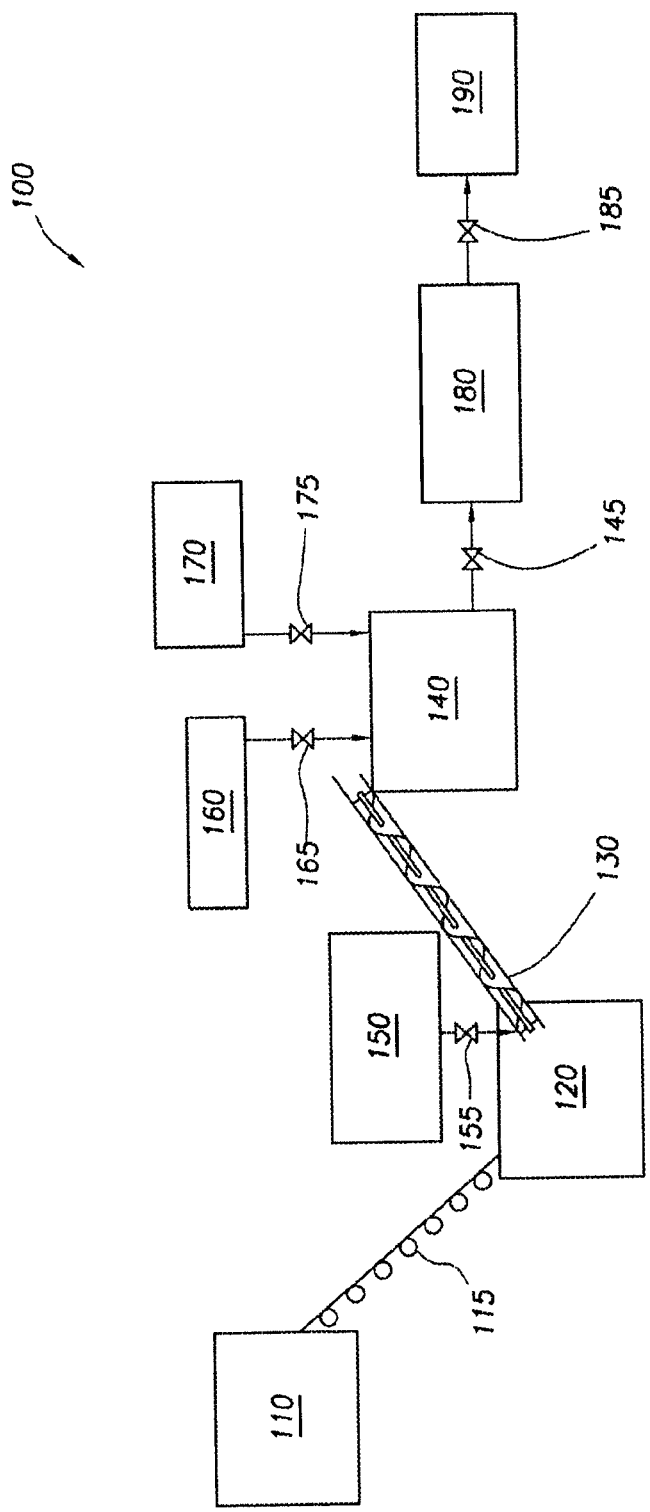
FIG. 1 is a diagram illustrating a treatment system according to certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to systems and methods for performing fracturing treatments in certain subterranean formations. More particularly, the present disclosure relates to systems and methods for treating proppant to mitigate erosion of equipment used in certain subterranean fracturing operations.

The present disclosure provides methods and systems for providing at least a partial coating of a hydratable polymer and/or dry friction reducer (DFR) on a plurality of proppant particulates used in fracturing operations. As utilized herein, a "dry friction reducer" or "DFR" is a chemical additive that alters fluid rheological properties to reduce friction created within the fluid as it flows. Such a DFR can be a hydratable polymer, and vice versa, in embodiments. In embodiments, the partial coating comprises a hydratable polymer not typically considered a DFR and/or a DFR that is not a hydratable polymer.

In embodiments, the fracturing operations utilize slickwater fluids or other treatment fluids having a relatively low viscosity (e.g., less than or equal to about 25, 20, 15, 10, 9, 8, 7, 6, 5, 4, or 3 cP or between 3 and 25 cP, between 3 and 10 cP, or between 3 and 5 cP). In the embodiments of the present disclosure, the proppant particulates are contacted with an aqueous liquid concentrate of a hydratable polymer and/or an amount of fresh water and a dry friction reducer (DFR), whereby the proppant particulates are at least partially coated with the hydratable polymer and/or the DFR at a job site (e.g., a well site) where the fracturing operation is performed, optionally while conveying those proppant particulates into a blender at the job site. Such techniques of coating particulates are sometimes referred to as "on-the-fly" coating. The proppant particulates coated in this manner are blended with an aqueous base fluid to form a treatment fluid, and the treatment fluid is then directly introduced into at least a portion of a subterranean formation and/or well bore.

Among the many potential advantages to the methods and compositions of the present disclosure, only some of which are alluded to herein, the methods and systems of the present disclosure may reduce the degree to which equipment at a well site through which fracturing fluids flow (including pumps, blenders, valves, conduits, connecting elbows, and the like) may be eroded by the flow of proppant-carrying fluids therethrough, particularly when such fluids are pumped at relatively high rates. For example, the hydratable polymer and/or DFR may absorb water once in contact with aqueous fluids, which may cause the coating comprising same to swell and/or expand in size and form a cushion or shock-absorbing coating on the proppant particulates. Thus, the hydratable polymer and/or DFR coating as described herein may make the proppant particulates less abrasive and/or may lessen the erosion impact of the proppant particulates on surfaces inside pumps or other fracturing equipment. In some embodiments, the methods and systems of the present disclosure also may facilitate the self-suspension of proppant in a treatment fluid, enhancing proppant suspension and transport without the need for viscosifying agents or other additives in the fluid itself. In some embodiments, the methods and systems of the present disclosure also may reduce friction and/or pumping horsepower in the course of slickwater fracturing operations, in some instances, with lower concentrations of polymeric additives than conventionally-used concentrations of friction reducing agents. In some embodiments, the methods and systems of the present disclosure may provide one or more of these aforementioned benefits without adding significant cost or complexity to the operation, among other reasons, by using the already existing equipment at the well site.

Techniques of at least partially coating the proppant particulates while conveying those proppant particulates into a blender at a job site (e.g., "on-the-fly") can include, for example, processes in which one stream is continuously introduced into another stream so that the streams are combined and mixed while continuing to flow as a single stream as part of an on-going treatment at the job site. One such on-the-fly coating method would involve conveying the dry proppant particulates and the liquid concentrate of the hydratable polymer (and/or proppant particulates, DFR and an amount of water) into a blender, for example, via a vessel or conduit. Once inside the vessel or conduit, the proppant particulates would be contacted with the liquid concentrate of the hydratable polymer (and/or with the amount of water and the DFR) and coated with the hydratable polymer (and/or the DFR), after which the particulates move into a blender. In those embodiments, a device such as an auger, sand screw, or other similar device (or a combination of such devices) could be used both to aid in mixing the particulates with the liquid concentrate (and/or with the amount of water and the DFR) and to convey the coated particulates into the blender. In other embodiments, the proppant particulates may be coated "on the fly" by spraying the liquid concentrate of the hydratable polymer onto the dry proppant particulates (and/or by spraying fresh water onto a solids mixture comprising the proppant particulates and the DFR or spraying water onto the dry proppant particulates to provide wetted proppant and subsequently contacting the wetted proppant with the dry DFR) as they move toward the blender (e.g., through a vessel or conduit, on a conveyer belt, or, for proppant particulates that are poured or otherwise dispensed from a storage container into the blender from above, falling into the blender unit via gravity). Such coating methods described in this paragraph are sometimes referred to as "dry coating" techniques. Batch or partial batch mixing also may be used to accomplish such coating. In some embodiments, one or more of these techniques may be used in or near "real time" with the fracturing operation in which the treatment fluid is formed in the blender is introduced into a subterranean formation and/or well bore. Although described as 'spraying', no particular spray pattern or spraying apparatus is mandated, and 'spraying' can comprise spraying in a spray pattern or otherwise contacting.

As utilized herein, reference to a 'DFR coating' indicates that the friction reducer (which can comprise a hydratable polymer or hydratable hydrogel) is added to the proppant particulates in a dry powder form (e.g., dry DFR is combined with dry proppant particulates to produce a solids mixture which is subsequently combined with an amount of water to produce the coated proppant particulates and/or dry DFR is combined with wetted proppant particulates comprising proppant particulates that have been wetted with an amount of water to produce a wetted solids mixture that is blended to provide the coated proppant particulates), whereas reference to a 'hydratable polymer coating' indicates that the hydratable polymer is added as a liquid concentrate to the proppant particulates to produce the coated proppant particulates. In embodiments, the amount of water comprises less than about 0.1, 0.2, 0.3, 0.4, 0.5, 1, 2, or 3 wt %, or from about 0.1 to about 3, from about 0.5 to about 3, or from about 1 to about 3 wt % of the coated proppant.

In some embodiments, the hydratable polymer and/or DFR coating may be disposed on the proppant particulates only temporarily and/or for a limited period of time (e.g., for less than about 60 seconds, or alternatively, less than about 30 seconds, 20 seconds, or 15 seconds). Among other reasons, the hydratable polymer and/or DFR coating may be made temporary in this way because the coating need only be present on the proppant particulates while the treatment fluid carrying those particulates passes through pumps, wellheads, and/or other equipment at the well site that may be eroded by the flow of proppant particulates therethrough. In at least some embodiments, the treatment fluid comprising the coated proppant particulates is pumped into the well bore at a relatively high rate such that the time required for the fluid to travel from the blender tub to the well bore is a relatively short period of time (e.g., less than about 30 seconds). Once the treatment fluid comprising the coated proppant particulates is downstream of such equipment, the hydratable polymer and/or DFR coating may no longer be useful or needed for mitigating erosion of that equipment. Moreover, for a variety of reasons, it may be desirable for the hydratable polymer and/or DFR coating to be removed from the proppant particulates soon after they enter the wellbore, allowing the hydratable polymer and/or DFR to disperse in the aqueous based fluid, thereby providing its friction reduction performance. In some embodiments, it may be desirable for the hydratable polymer and/or DFR coating to be removed from the proppant particulates before those particulates penetrate one or more fractures in the subterranean formation. For example, in some embodiments, if the hydratable polymer and/or DFR coating on the proppant particulates were permanent, this coating could potentially hinder its complete removal from the proppant particulates as a result of forming a tight proppant pack in the open space of fracture, and/or may induce permeability damage therein. For at least these reasons, in some embodiments, the methods of the present disclosure may include conveying the proppant particulates into the blender and/or introduced into the formation without allowing the hydratable polymer and/or DFR coating on the proppant particulates to stand and/or cure for a significant period of time.

In some embodiments, the (DFR and/or hydratable polymer) coating thus may become detached from the proppant particulates after the treatment fluid carrying those particulates has passed through a pump, wellhead, and/or other equipment at the well site through which treatment fluid passes before entering the well bore or formation. This may be accomplished, among other ways, by the addition of a breaker, chelator, surfactant, or other additive that causes the coating to detach from the proppant particulates, or due to shear forces on the proppant particulate in the treatment fluid. In these embodiments, the DFR and/or the hydratable polymer of the coating may become dispersed in the treatment fluid and, among other things, serve as a friction reducer for the treatment fluid as it passes through tubing or conduits in the well bore and/or the well bore itself.

The proppant particulates used in the methods and systems of the present disclosure may comprise any proppant particulate suitable for use in a subterranean fracturing operation. A particulate for use as a proppant particulate may be selected based on the characteristics of size range, crush strength, and solid stability in the types of fluids that are encountered or used in wells. Examples of proppant particulate materials that may be suitable in certain embodiments include, without limitation, sand, gravel, bauxite, ceramic materials, glass materials, polymer materials, wood, plant and vegetable matter, nut hulls, walnut hulls, cottonseed hulls, cured cement, fly ash, fibrous materials, composite particulates, hollow spheres or porous particulate. Mixtures of different kinds or sizes of proppant particulate can be used as well.

The proppant particulate may be selected to be an appropriate size to prop open the fracture and bridge the fracture width expected to be created by the fracturing conditions and the fracturing fluid. In certain embodiments, appropriate sizes of particulate for use as a proppant particulate may range from about 8 to about 600 U.S. Standard Mesh. In certain embodiments, a proppant particulate may be sand-sized, which geologically is defined as having a largest dimension ranging from about 0.1 microns up to about 2 millimeters (mm). In certain embodiments, the proppant particulates may comprise particulates of smaller sizes, including microparticles, nanoparticles, or any combinations thereof. According to certain embodiments of the present disclosure, the concentration of proppant particulate in the treatment fluid may depend upon factors such as the nature of the subterranean formation. In some embodiments, the concentration of proppant particulate in the treatment fluid may be in the range of from about 0.1 pounds of proppant per gallon of treatment fluid (lb/gal) to about 5 lb/gal.

The hydratable polymer(s) and/or DFR(s) used in the methods and systems of the present disclosure may comprise any linear (e.g., not cross-linked) polymer that may swell or otherwise hydrate in the presence of an aqueous fluid and form a film or coating on a solid surface. In certain embodiments, the hydratable polymer may be a synthetic polymer. Additionally, for example, the hydratable polymer may be an anionic polymer or a cationic polymer, in accordance with embodiments of the present disclosure. By way of example, synthetic polymers may comprise any of a variety of monomeric units, including acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, acrylic acid esters, methacrylic acid esters and combinations thereof.

In some embodiments, the hydratable polymer(s) and/or DFR(s) included in the treatment fluid may have a molecular weight sufficient to provide a desired level of friction reduction once they become detached from the surface of the proppant particulate. By way of example, the average molecular weight of suitable hydratable polymers and/or DFRs may be at least about 2,500,000, as determined using intrinsic viscosities. In certain embodiments, the average molecular weight of suitable hydratable polymers and/or DFRs may be in the range of from about 7,500,000 to about 20,000,000. Hydratable polymers and/or DFRs having molecular weights outside the listed range still may provide some degree of friction reduction.

One example of an anionic hydratable polymer that may be suitable in certain embodiments of the present disclosure is a polymer comprising acrylamide and acrylic acid. The acrylamide and acrylic acid may be present in the polymer in any suitable concentration. An example of a suitable anionic hydratable polymer may comprise acrylamide in an amount in the range of from about 5% to about 95% and acrylic acid in an amount in the range of from about 5% to about 95%. Another example of a suitable anionic hydratable polymer may comprise acrylamide in an amount in the range of from about 60% to about 90% by weight and acrylic acid in an amount in the range of from about 10% to about 40% by weight. Another example of a suitable anionic hydratable polymer may comprise acrylamide in an amount in the range of from about 80% to about 90% by weight and acrylic acid in an amount in the range of from about 10% to about 20% by weight. Yet another example of a suitable anionic hydratable polymer may comprise acrylamide in an amount of about 85% by weight and acrylic acid in an amount of about 15% by weight. As previously mentioned, one or more additional monomers may be included in the anionic hydratable polymer comprising acrylamide and acrylic acid. By way of example, the additional monomer(s) may be present in the anionic friction reducing polymer in an amount up to about 20% by weight of the polymer.

Suitable hydratable polymers may be provided in an acid form or in a salt form. As will be appreciated, a variety of salts may be prepared, for example, by neutralizing the acid form of the acrylic acid monomer or the 2-acrylamido-2-methylpropane sulfonic acid monomer. In addition, the acid form of the polymer may be neutralized by ions present in the treatment fluid. Indeed, as used herein, the term "polymer" is intended to refer to the acid form of the hydratable polymer, as well as its various salts. As will be appreciated, the hydratable polymer and/or DFR suitable for use in the methods and systems of the present disclosure may be prepared by any suitable technique. For example, the anionic hydratable polymer comprising acrylamide and acrylic acid may be prepared through polymerization of acrylamide and acrylic acid or through hydrolysis of polyacrylamide (e.g., partially hydrolyzed polyacrylamide). In some embodiments, the hydratable polymer may be a salt of a swellable polymer selected from the group consisting of salts of carboxyalkyl starch, salts of carboxymethyl starch, salts of carboxymethyl cellulose, salts of crosslinked carboxyalkyl polysaccharide, derivatized cellulose, guar-based polymers, derivatized guar polymers, synthetic polymers, biopolymers, or any combination thereof.

In addition, the hydratable polymers suitable for use in embodiments of the present disclosure may be initially provided in any suitable form that can be used to form an aqueous liquid concentrate. By way of example, the hydratable polymers may be provided in an aqueous solution or may be provided in dry form and then combined with a small amount of water. As used herein, the term "aqueous liquid concentrate" refers to a composition comprising the hydratable polymer in a more concentrated form than in the final treatment fluid that will be used in the subterranean treatment. By way of example, the aqueous liquid concentrate may comprise the hydratable polymer in an amount in the range of about 5% to about 100% by weight of the concentrate, alternatively, in an amount in the range of about 15% to about 60% by weight of the concentrate, and, alternatively, in an amount in the range of about 25% to about 45% by weight of concentrate. An example of hydratable polymer dispersed in an aqueous continuous phase is provided by Halliburton Energy Services, Inc., under the name FR-76™ additive. One of ordinary skill in the art, with the benefit of this disclosure, will be able to select an appropriate form for the hydratable polymer for a particular application based on a number of factors, including handling, ease of dissolution to a dilute polymer system, cost, performance and environmental factors, among others.

In embodiments, the DFR comprises a polymer. In embodiments, the DFR comprises a synthetic polymer. In embodiments, the DFR comprises anionic or cationic polymer. In embodiments, the polymer includes a high molecular weight polymer. In embodiments, the DFR comprises polyacrylamide (PAM). In embodiments, the DFR comprises PAM, polyacrylic acid, hydrolyzed polyacrylamide, acrylamidomethylpropane sulfonate, or a combination thereof. In embodiments, the DFR comprises a polyacrylamide (PAM) copolymer. In embodiments, the DFR is a high viscosity dry friction reducer (HVDFR) defined as a DFR that, when added to a fluid such as a particulate slurry (e.g., proppant-laden fracturing fluid), lowers the particle critical sedimentation velocity of the particulate slurry. In embodiments, the DFR is a fast acting friction reducer. In embodiments, the DFR is a fast acting friction reducer which achieves its active function in a time interval of less than or equal to 60, 45, or 30 seconds. In embodiments, the DFR is a fast acting friction reducer which achieves at least 80 percent of its ultimate fluid friction reduction effect in a time interval of less than or equal to 60, 45, or 30 seconds. In embodiments, the DFR is a fast acting friction reducer which achieves at least 80 percent of its ultimate fluid viscosifying effect in a time interval of less than or equal to 60, 45, or 30 seconds. In embodiments, the DFR is a solid material at ambient temperature and pressure. In embodiments, the DFR is an associative entity capable of forming extended structures in a fluid. In embodiments, the DFR has a combination of the aforementioned features (e.g., is an associative entity capable of forming extended structures in a fluid, a polymer, and comprises PAM). In embodiments, the DFR utilized to form the DFR coating comprises a dry hydratable hydrogel. In such embodiments, a DFR source (e.g., DFR source 356 detailed hereinbelow with reference to FIG. 3A and FIG. 3B) comprises a source of the dry hydratable hydrogel.

In some embodiments, the proppant particulates optionally may be contacted and/or coated with a functionalizing agent, such as a silane coupling agent, among other purposes, to help the hydratable polymer attach or adhere to the surface of the proppant particulate. In some embodiments, the functionalizing agent may be applied as a liquid additive to the surface of the dry proppant particulates "on-the-fly" as the proppant particulates are being conveyed to a blender, using any of the aforementioned coating techniques discussed with regard to the hydratable polymer and/or DFR. For example, in some embodiments, a liquid solution or concentrate of the functionalizing agent may be mixed with the proppant particulate using a device such as a sand screw or auger upstream of the location where the hydratable polymer and/or DFR is added and mixed using that same device. In some embodiments, the functionalizing agent may be used in an amount of about 0.05% to about 0.2% (w/w) of the proppant particulates.

The aqueous base fluid used to form the treatment fluids used in the methods and systems of the present disclosure may comprise water from any source. The term "base fluid" refers to the major component of the fluid (as opposed to components dissolved and/or suspended therein), and does not indicate any particular condition or property of that fluid such as its mass, amount, pH, etc. Aqueous fluids that may be suitable include fresh water, salt water (e.g., water containing one or more salts dissolved therein), brine (e.g., saturated salt water), seawater, or any combination thereof. In certain embodiments of the present disclosure, the aqueous fluids comprise one or more ionic species, such as those formed by salts dissolved in water. For example, seawater and/or produced water may comprise a variety of divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate. Upon contacting with the aqueous base fluid, the at least partial coating described herein can swell to form a swelled coating.

In certain embodiments, the treatment fluids used in the methods and systems of the present disclosure optionally may comprise a breaker additive, among other purposes, to degrade the hydratable polymer and/or friction reducers in the fluid and/or facilitate removal of any filter cake left by the treatment fluid in the subterranean formation. Breaker additives that may be suitable for use in certain embodiments of the present disclosure include, but are not limited to, oxidizers, enzymes, acids, acid-releasing materials, chelators, and any combinations thereof. In some embodiments, the breaker additive may be encapsulated or otherwise formulated to delay its reaction with other components in the treatment fluid.

In certain embodiments, the treatment fluids used in the methods and systems of the present disclosure optionally may comprise any number of additional additives. Examples of such additional additives include, but are not limited to, salts, surfactants, acids, diverting agents, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, $H_2S$ scavengers, $CO_2$ scavengers, oxygen scavengers, hydrate inhibitors, lubricants, weighting agents, relative permeability modifiers, resins, wetting agents, coating enhancement agents, filter cake removal agents, antifreeze agents (e.g., ethylene glycol), and the like. A person skilled in the art, with the benefit of this disclosure, will recognize the types of additives that may be included in the fluids of the present disclosure for a particular application.

The treatment fluids of the present disclosure can be used in a variety of subterranean treatment operations, including but not limited to fracturing operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. In some embodiments, the fracturing operations of the present disclosure may comprise injecting or otherwise introducing into a subterranean formation and/or well bore a pad fluid that does not comprise a substantial amount of proppant particulates (e.g., less than 0.01 pounds per gallon (ppg)) at a pressure sufficient to initiate, create, or enhance at least one fracture in the subterranean formation. In these embodiments, the pad fluid may be followed by a treatment fluid that comprises proppant particulates that are at least partially coated with a hydratable polymer and/or DFR coating in accordance with the present disclosure. In certain embodiments, a treatment fluid that comprises proppant particulates that are at least partially coated with a hydratable polymer and/or DFR coating in accordance with the present disclosure may be injected or otherwise introduced into the well bore and/or subterranean formation at a pressure sufficient to initiate, create, or enhance at least one fracture in the subterranean formation, with or without a preceding pad fluid. In some embodiments, the fracturing operations of the present disclosure may further comprise isolating and/or perforating an interval in the well bore corresponding to a portion of the subterranean formation where one or more fractures are to be created and/or enhanced. Use of the term injecting should be interpreted herein to mean "injecting via injection apparatus or otherwise introducing or adding."

The amount (or concentration) of DFR or hydratable polymer to be coated onto the proppant particulates can be based on a typical polymer concentration designed to be added to the blender (e.g., blender 140/240/340 detailed further hereinbelow) in forming the treatment fluid (e.g., friction reduction fracturing fluid).

An example of a system that may be used to prepare treatment fluids in accordance with the present disclosure is illustrated in FIG. 1. Referring now to FIG. 1, system 100 includes a proppant source 110 from which proppant particulates such as sand are supplied. In some embodiments, proppant source 110 may comprise a container, vehicle, or vessel containing proppant particulates, or may comprise a conduit through which proppant particulates may be dispensed. In the embodiment shown, a ramp or conveyer belt 115 may be positioned to facilitate the movement of proppant particulates out of the proppant source 110 and into a hopper 120. The hopper 120 may comprise a funnel-shaped vessel and/or other equipment to facilitate the metering and/or transfer of the desired quantities of proppant particulates into a blender 140. Proppant particulates may be conveyed from the hopper 120 to the blender 140 via a sand screw 130 having one end coupled to an outlet of the hopper 120 and another end coupled to an inlet of the blender 140. As noted above, in other embodiments, sand screw 130 may be replaced with other devices such as augers, conveyer belts, or other devices suitable for conveying proppant particulates and/or mixing them with a liquid substance (e.g., the liquid concentrate of the hydratable polymer).

A liquid hydratable polymer source 150 (e.g., container, conduit or other such device) may be provided to dispense the liquid concentrate comprising the hydratable polymer into the sand screw 130 so that the liquid concentrate may be mixed with and contact the proppant particulates as they move along the sand screw 130. The liquid hydratable polymer source 150 may be equipped with a liquid additive pump 155 to control the flow of the liquid concentrate into the sand screw 130. In the embodiment shown the liquid additive pump 155 is disposed adjacent to a point along the sand screw that is closer to the hopper 120 than it is to the blender 140. However, it is contemplated that the liquid concentrate may be dispensed into the sand screw (or other device used to convey the proppant particulate to the blender) at any point along its length. For example, in other embodiments, the liquid additive pump 155 is disposed adjacent to a point along the sand screw that is closer to the blender 140 than it is to the hopper 120.

As shown, a breaker additive source 160 and an aqueous base fluid source 170 are provided to dispense breaker additives or aqueous base fluids, respectively into the blender 140. As shown, those devices are also each equipped with a liquid additive pump 165 or 175 to control the flow of aqueous base fluid or breaker additives into the blender 140. The blender 140 blends the aqueous base fluid, the breaker additive, and the coated proppant particulates from sand screw 130 together to form a treatment fluid. Optionally, other additive sources (not shown) may be provided that dispense additional additives into the blender 140 for blending into the treatment fluid. Once the treatment fluid is formed, its flow out of the blender 140 may be controlled via displacement pump 145. The treatment fluid may flow into additional surface equipment 180, that may be used to pressurize or pump the treatment fluid into the wellhead 190 and into the formation (not shown) at the desired rate and pressure. Such equipment 180 may include any number of pumps, missile assemblies, fracturing manifolds, and the like, and the flow of treatment fluid out of that equipment to wellhead 190 may be further controlled by valve 185. As mentioned previously, the presence of the hydratable polymer coating on the surface of the proppant particulates may mitigate or prevent the erosion of internal surfaces in, for example, blender 140, displacement pump 145, connecting elbows of pipes (not shown), and/or equipment 180 as the treatment fluid is blended and flows therein. Once the treatment fluids of the present disclosure have flown through the wellhead 190 and into the formation (not shown), the hydratable polymer coated onto the proppant particulates may detach from the proppant particulates, among other reasons, to serve as a friction reducing agent in the treatment fluid as it is pumped through casing, tubing, or other equipment in the well bore.

Figure 2:
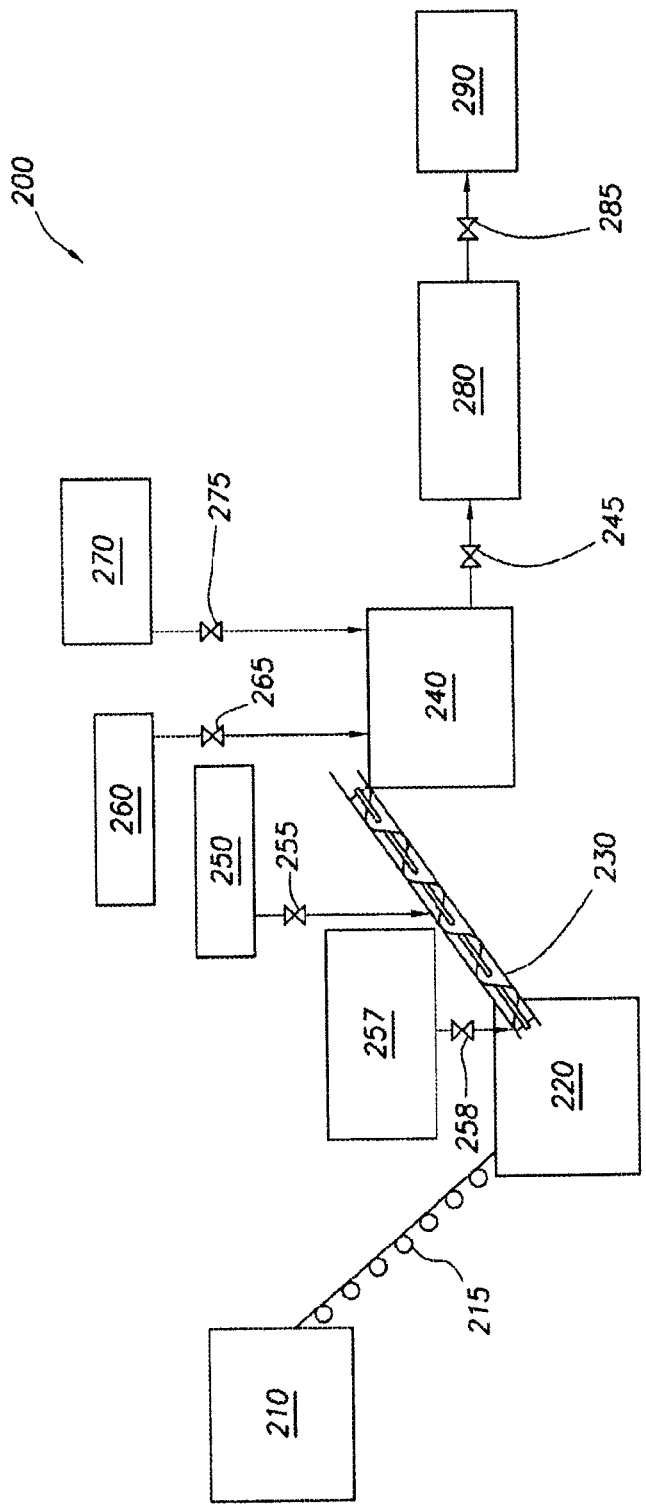
FIG. 2 is a diagram illustrating another treatment system according to certain embodiments of the present disclosure.

Referring now to FIG. 2, another example of a system that may be used to prepare treatment fluids in accordance with the present disclosure is illustrated. Referring now to FIG. 2, system 200 includes several of the same components that were described with regard to the system shown in FIG. 1, including a proppant source 210, ramp or conveyer belt 215, hopper 220, sand screw 230, blender 240, displacement pump 245, breaker additive source 260 (and associated liquid additive pump 265), aqueous base fluid source 270 (and associated liquid additive pump 275), equipment 280, valve 285, and wellhead 290. Like system 100 in FIG. 1, system 200 also includes a liquid hydratable polymer source 250 (e.g., container, conduit or other such device) equipped with a liquid additive pump 255 to dispense the liquid concentrate comprising the hydratable polymer into the sand screw 230 so that the liquid concentrate may be mixed with and contact the proppant particulates as they move along the sand screw 230. System 200 also includes a functionalizing agent source 257 (e.g., container, conduit or other such device) from which a functionalizing agent such as an organosilane may be dispensed into the sand screw 230 so that the functionalizing agent may be mixed with and contact the proppant particulates as they move along the sand screw 230. The functionalizing agent source 257 may be equipped with a liquid additive pump 258 to control the flow of the functionalizing agent into the sand screw 230. In the embodiment shown in FIG. 2, the liquid additive pump 255 for dispensing the liquid concentrate of hydratable polymer is disposed adjacent to a point along the sand screw 230 between the valve 258 and the blender 140, in other words, downstream of liquid additive pump 258 where the functionalizing agent is dispensed. Among other benefits, this arrangement may allow for the functionalizing agent to contact the surface of the proppant particulates and treat those surfaces so that the hydratable polymer will more readily form a coating on the proppant particulates. As a person of skill in the art will recognize with the benefit of this disclosure, this relative arrangement of devices for applying the functionalizing agent and hydratable polymer may be used with devices or techniques for conveying the proppant to a blender other than a sand screw, including those referenced in the above discussion of "on-the-fly" coating techniques.

Figure 3A:
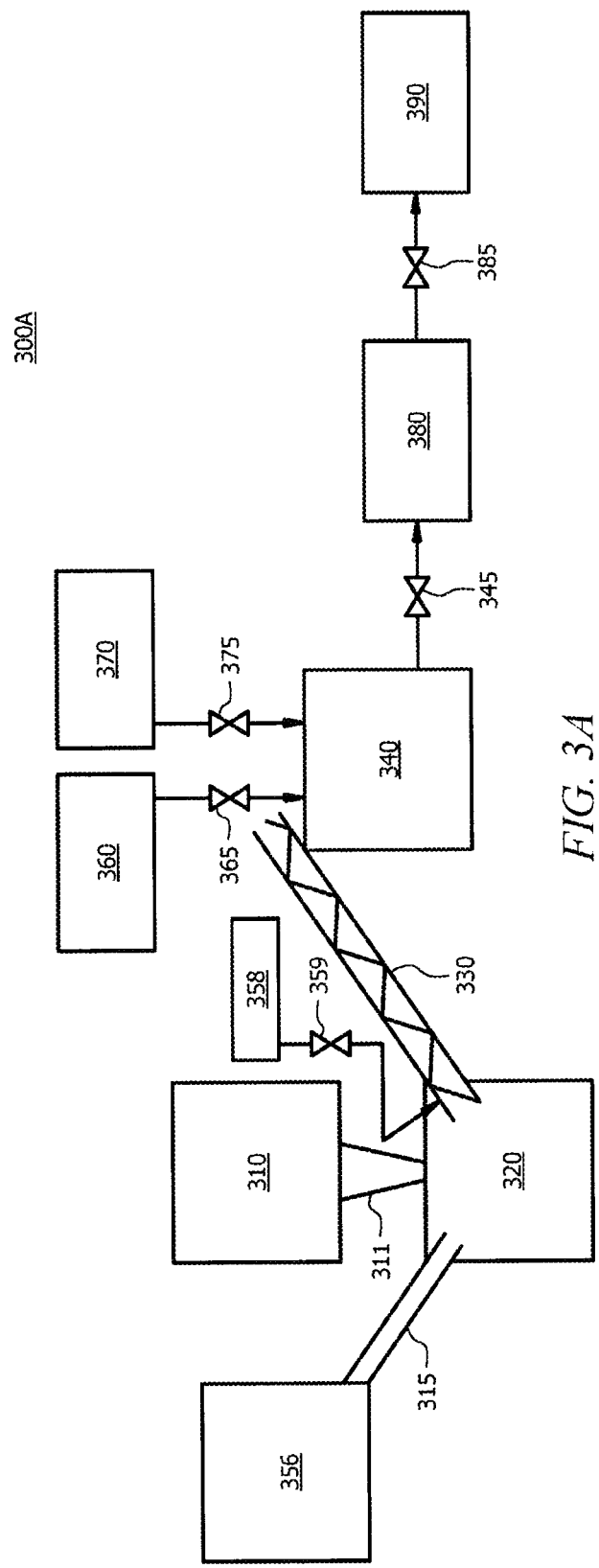
FIG. 3A is a diagram illustrating another treatment system according to embodiments of the present disclosure.

Referring now to FIG. 3A, another example of a system that may be used to prepare treatment fluids in accordance with the present disclosure is illustrated. Referring now to FIG. 3A, system 300A includes several of the same components that were described with regard to the system shown in FIG. 1, including a proppant source 310 (e.g., a sand source), ramp or conveyer belt 315, hopper 320 (e.g., a sand or proppant hopper), proppant (e.g., sand) screw 330, blender 340, displacement pump 345, breaker additive source 360 (and associated liquid additive pump 365), aqueous base fluid source 370 (and associated liquid additive pump 375), equipment 380, valve 385, and wellhead 390. System 300 also includes a DFR source 356 (e.g., container, conduit or other such device) from which a dry (e.g., powdered) DFR may be dispensed into the hopper 320 so that DFR may be mixed with and contact the proppant particulates (e.g., sand) to form a solids mixture comprising the proppant (e.g., sand) and the DFR. As depicted in FIG. 3A, ramp or conveyer belt 315 may be positioned to facilitate the movement of DFR out of DFR source 356 and into hopper 320, while proppant (e.g., sand) can be introduced into hopper 320 via inlet 311, which may provide for introduction of proppant (e.g., sand) into hopper 320 via, for example free fall (i.e., gravity feed). Alternatively, a ramp or conveyor belt such as 315 can be utilized to introduce proppant (e.g., sand) into hopper 320 via proppant source 310 and/or dry DFR can be introduced into hopper 320 via free fall from DFR source 356. System 300 also includes a freshwater source 358 (e.g., container, conduit, tank, or other such device) which can be equipped with a liquid water pump and valve 359 to dispense fresh water into the proppant (e.g., sand) screw 330 so that the fresh water may be mixed with (e.g., sprayed on) and contact the solids mixture of the proppant particulates (e.g., sand) and DFR as they move along the proppant (e.g., sand) screw 330. In the embodiment shown in FIG. 3A, the liquid water pump 359 is configured for dispensing the water adjacent to a point along the proppant (e.g., sand) screw 330 adjacent hopper 320. Alternatively, water may be introduced elsewhere along proppant (e.g., sand) screw 330, in embodiments.

Figure 3B:
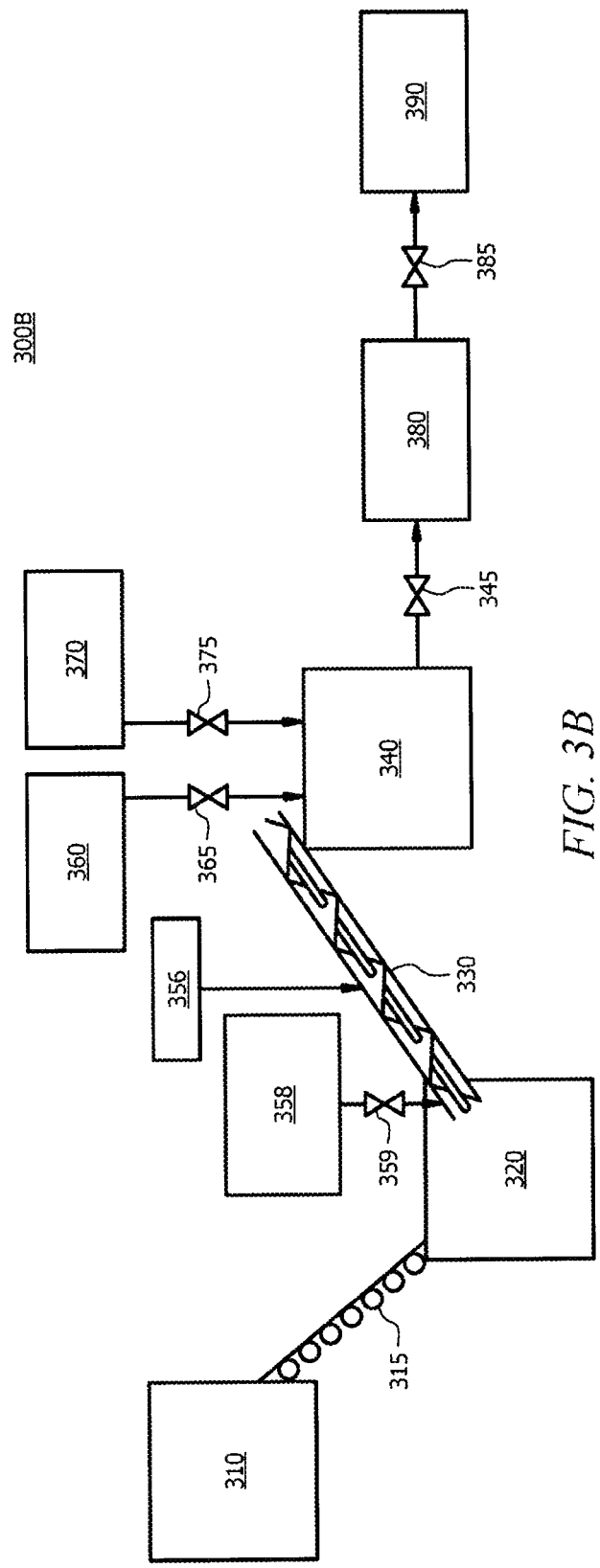
FIG. 3B is a diagram illustrating another treatment system according to embodiments of the present disclosure.

Referring now to FIG. 3B, another example of a system that may be used to prepare treatment fluids in accordance with the present disclosure is illustrated. Referring now to FIG. 3B, system 300B includes several of the same components that were described with regard to the system shown in FIG. 3A, including a proppant (e.g., sand) source 310, ramp or conveyer belt 315, hopper 320 (e.g., proppant or sand hopper), proppant (e.g., sand) screw 330, blender 340, displacement pump 345, breaker additive source 360 (and associated liquid additive pump 365), aqueous base fluid source 370 (and associated liquid additive pump 375), equipment 380, valve 385, and wellhead 390. System 300B also includes a dry DFR source 356 (e.g., container, conduit or other such device) from which a dry (e.g., powdered) DFR may be dispensed onto wetted proppant on sand screw 330 so that DFR may be mixed with and contact the proppant particulates to form a wetted solids mixture comprising the proppant, the DFR, and an amount of water. In the embodiment of FIG. 3B, ramp or conveyor belt 315 can be utilized to introduce proppant (e.g., sand) from proppant (e.g., sand) source 310 into proppant (e.g., sand) hopper 320. In this embodiment, fresh water from freshwater source 358 can be dispensed via fresh water pump and valve 359 onto proppant (e.g., sand) screw 330, whereby proppant (e.g., sand) is wetted to provide a wetted proppant (e.g., wetted sand). DFR source 356 can be configured such that DFR can be introduced onto proppant (e.g., sand) screw 330 downstream from water addition from water source 358, whereby the wetted proppant (e.g., wetted sand) can be contacted with DFR from DFR source 356 to provide coated proppant (e.g., coated sand) that is introduced into blender 340. Such relative arrangement of devices for applying the water and DFR, as described with reference to FIGS. 3A and 3B, may be used with devices or techniques for conveying the proppant (e.g., sand) to a blender other than a proppant (e.g., sand) screw, including those referenced in the above discussion of "on-the-fly" coating techniques. Proppant (e.g., sand) coated with DFR as described herein is placed in blender tub 340 and combined with an aqueous based fluid (e.g., water) from source 370 controlled by valve 375 and blended to form a proppant laden fluid (e.g., a fracturing fluid), which may be conveyed to pumping equipment 380 and further pumped into a well via wellhead 390, for example to perform a hydraulic fracturing operation on a subterranean formation penetrated by the wellbore. Flow from the blender 340 to the wellhead 390 may be controlled by one or more valves 345 and 385. It is noted that the system of FIG. 3B for applying wetted proppant with DFR can be operated substantially the same as described hereinabove with regard to FIG. 2, in embodiments, but with "DFR in place of "liquid hydratable polymer", and "fresh water" in place of "functionalizing agent".

In embodiments, a method of mitigating erosion of fracturing equipment during a fracturing treatment comprises: forming a plurality of coated proppant particulates having at least a partial coating of a dry friction reducer (DFR) and/or a hydratable polymer on a proppant; blending the plurality of coated proppant particulates with an aqueous base fluid in the blender to form a treatment fluid, whereby the at least the partial coating hydrates and swells to form a swelled coating which mitigates a striking impact of the proppant on downstream fracturing equipment; injecting the treatment fluid downhole via the fracturing equipment whereby the proppant is placed in fractures created by the injection of a fracturing fluid.

In embodiments, a method of mitigating erosion of fracturing equipment during a fracturing treatment comprises: adding a solids-free fracturing fluid into the wellbore at an injection rate for generating a treating pressure above a fracture gradient to create one or more fractures in the subterranean formation; adding, via fracturing equipment, a treatment fluid into the wellbore to place proppant into the one or more fractures, wherein the treatment fluid is prepared as described herein.

To facilitate a better understanding of the present disclosure, the following examples of certain aspects of certain embodiments are given. The following examples are not the only examples that could be given according to the present disclosure and are not intended to limit the scope of the disclosure or claims.

EXAMPLES

Example 1: Friction Reduction Performance

A friction flow loop was used to compare the friction reduction performance of slickwater that was prepared with a known concentration of dry FR polymer coated on sand to a control slickwater in which this same FR polymer concentration was dispersed in tap water. For the control slickwater, a 10 L volume of slickwater was prepared by mixing 3.6 g of dry FR in 10 L of tap water to prepare a slickwater with a dry FR concentration of 3 lbm/Mgal. For the slickwater prepared with dry FR-coated sand, 600 g of 100-mesh sand was first dry mixed with 3.6 g of dry FR to provide a 3-ppg sand concentration in 10 L of water. A volume of 24 mL of fresh water was then slowly dribbled into the sand/dry FR mixture while mixing to dampen the content and anchor the dry FR onto sand surfaces. This sand/FR mixture was then poured into the container containing 10 L of tap water, while the water was being stirred at 400 rpm. The stirring was continued for approximately 2 min using a handheld drill. After this stirring period, sand was allowed to settle to the bottom of the container, and the slickwater was separated for use in the flow loop testing to determine friction reduction performance.

Figure 4:
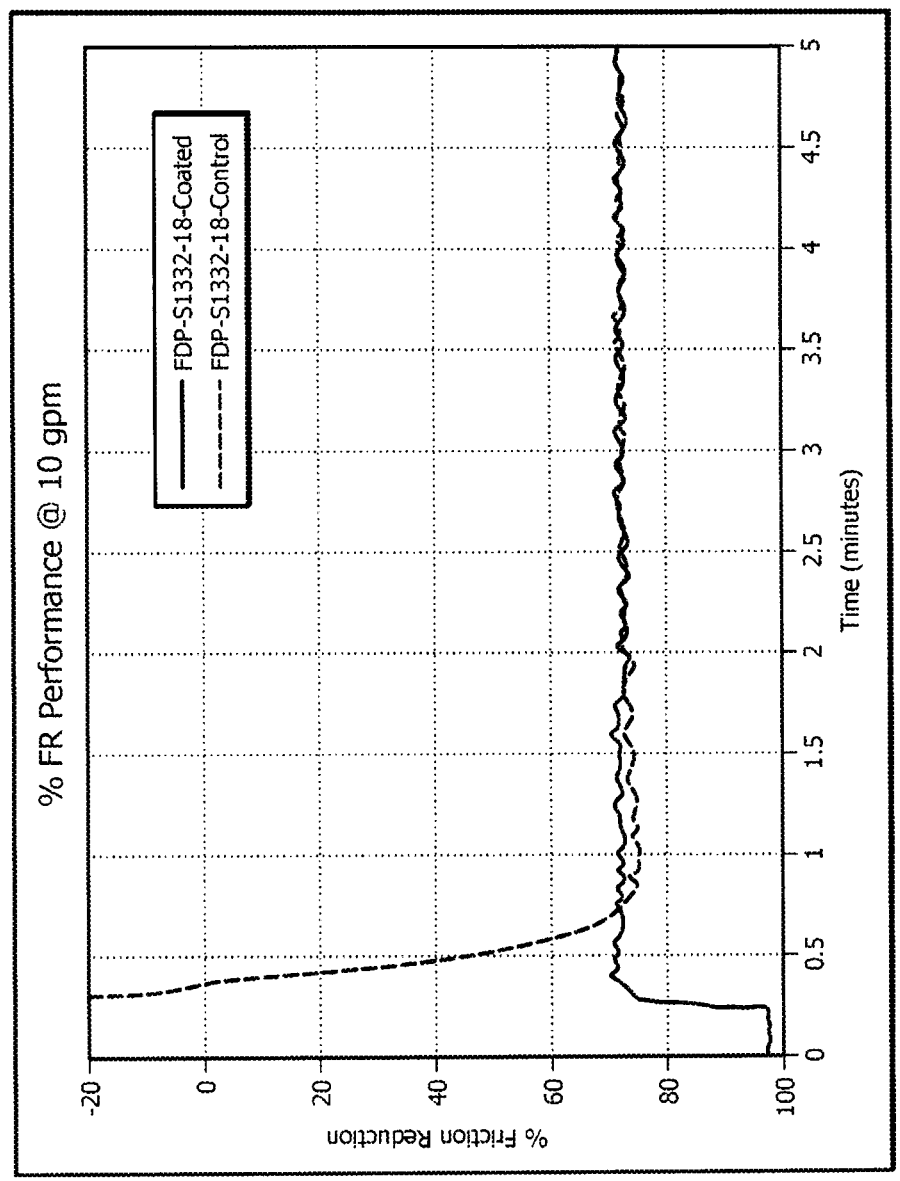
FIG. 4 is a plot of percent friction reduction (% FR) as a function of time (minutes) for the results of Example 1.

As seen in FIG. 4, the friction reduction performance of the material was not degraded using the method. The control and coated methods both exhibited a percent FR reduction (% FR) of approximately 72% at about 1.75 minutes.

Example 2: Erosion Testing

Three Control samples of treatment fluids were prepared and tested as follows. For Control #1, 24 grams of 100-mesh sand was added to a 1-L Waring blender containing 200 mL of deionized (DI) water (i.e., 1 ppg concentration of sand). For Control #2, 24 grams of 100-mesh sand was added to a 1-L Waring blender containing 200 mL of deionized (DI) water (i.e., 1 ppg concentration of sand), and 0.2 mL of FR76™ additive, an anionic hydratable polymer additive provided by Halliburton Energy Services, Inc., was added (i.e., 1 gal/Mgal concentration of the FR76™ additive). For Control #3, 24 grams of 100-mesh sand was added to a 1-L Waring blender containing 200 mL of deionized (DI) water (i.e., 1 ppg concentration of sand), and 0.4 mL of FR-76™ additive was added. Test #1 sample was prepared by dry coating 0.2 mL of FR76™ additive onto 24 grams of 100-mesh sand, and the coated sand was added to a 1-L Waring blender containing 200 mL of DI water. Test #2 sample was prepared by dry coating 0.4 mL of FR76™ additive onto 24 grams of 100-mesh sand, and the coated sand was added to a 1-L Waring blender containing 200 mL of DI water. Table 1 shows the compositions of Control #1, Control #2, and Control #3.

TABLE 1

| Sample | Components |
| --- | --- |
| Control #1 | 24 g of 100-mesh sand in 200 mL DI water |
| Control #2 | 24 g of 100-mesh sand and 0.2 mL FR-76 ™ in 200 mL DI water |
| Control #3 | 24 g of 100-mesh sand and 0.4 mL FR-76 ™ in 200 mL DI water |
| Test #1 | 24 g of 100-mesh sand dry coated with 0.2 mL FR-76 ™, added to 200 mL DI water |
| Test #2 | 24 g of 100-mesh sand dry coated with 0.4 mL FR-76 ™, added to 200 mL DI water |
| Comparative | 24g of 100-mesh sand dry coated with 1% SandWedge ® NT, added to 200 mL DI water |

Figure 5:
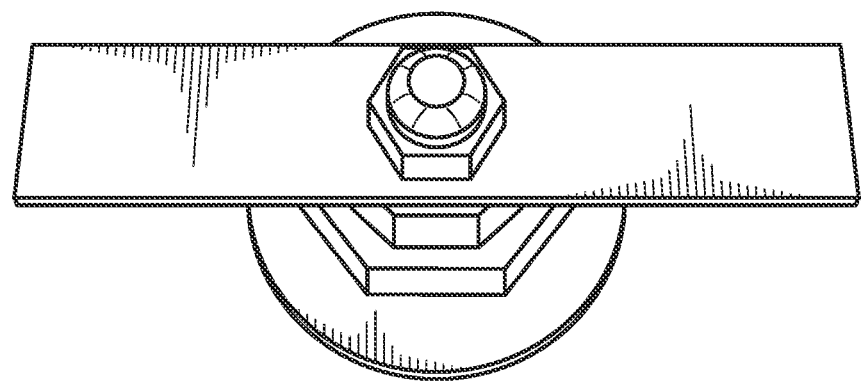
FIG. 5 is an illustration of the flat metal blade utilized in the blender of Example 2.
Figure 6:
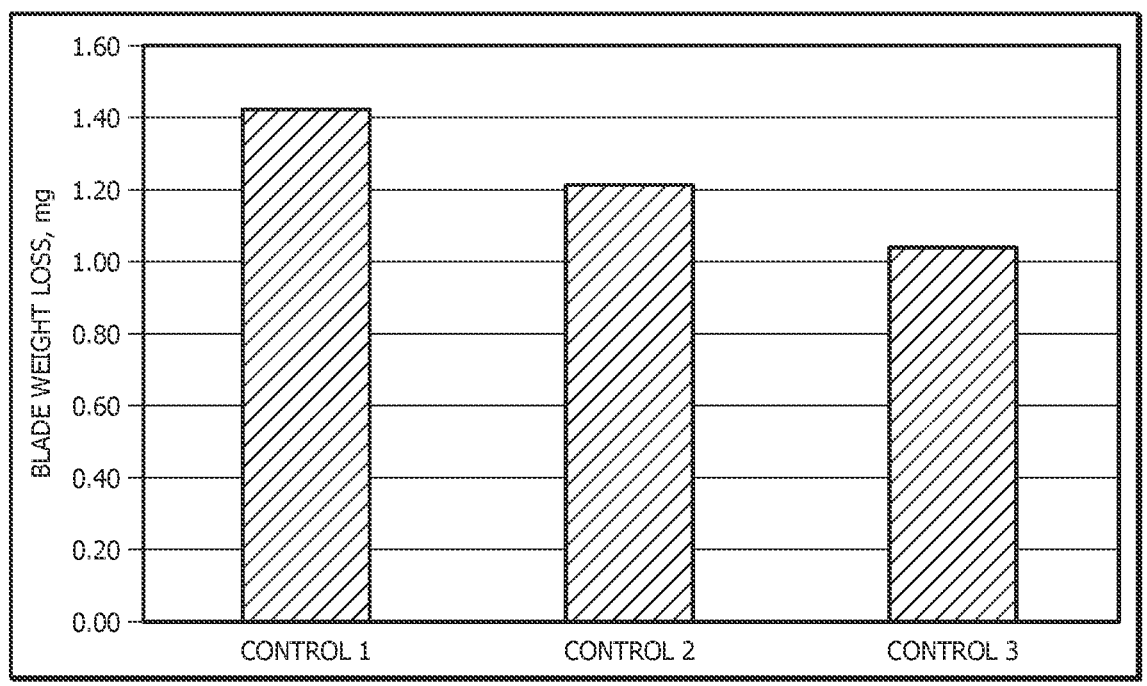
FIG. 6 is a graph illustrating data from erosion testing of certain treatment fluids of Example 2, including treatment fluids according to certain embodiments of the present disclosure.

Each of Control #1, Control #2, and Control #3 was blended in the Waring blender for 45 minutes at 3,000 rpm using a flat metal blade of a known mass. FIG. 5 depicts such a flat blade. Each blade was weighed before and after blending to determine its decrease in mass during the blending process. The amounts of the decreases in the mass of each blade after blending each sample are shown in FIG. 6. As demonstrated by this data, while the presence of the hydratable polymer dispersed in the fluid reduced the erosion of the blender blade to some degree, dry coating the same amount of the hydratable polymer onto the sand, as per this disclosure, reduced the erosion of the blender blade even further.

Additional samples of treatment fluids, including Test #1 and Test #2 shown in Table 1, were prepared by separately adding the components listed in Table 1 to 1 L Waring blenders. Test #1 comprised 24 g of 100-mesh sand dry coated with 0.2 mL FR-76™, added to 200 mL DI water, while Test #2 comprised 24 g of 100-mesh sand dry coated with 0.4 mL FR-76™, added to 200 mL DI water. A comparative sample ('Comparative' in FIG. 7 and Table 1) comprising SANDWEDGE® NT is a polymeric resin available from Halliburton Energy Services, Inc.

Figure 7:
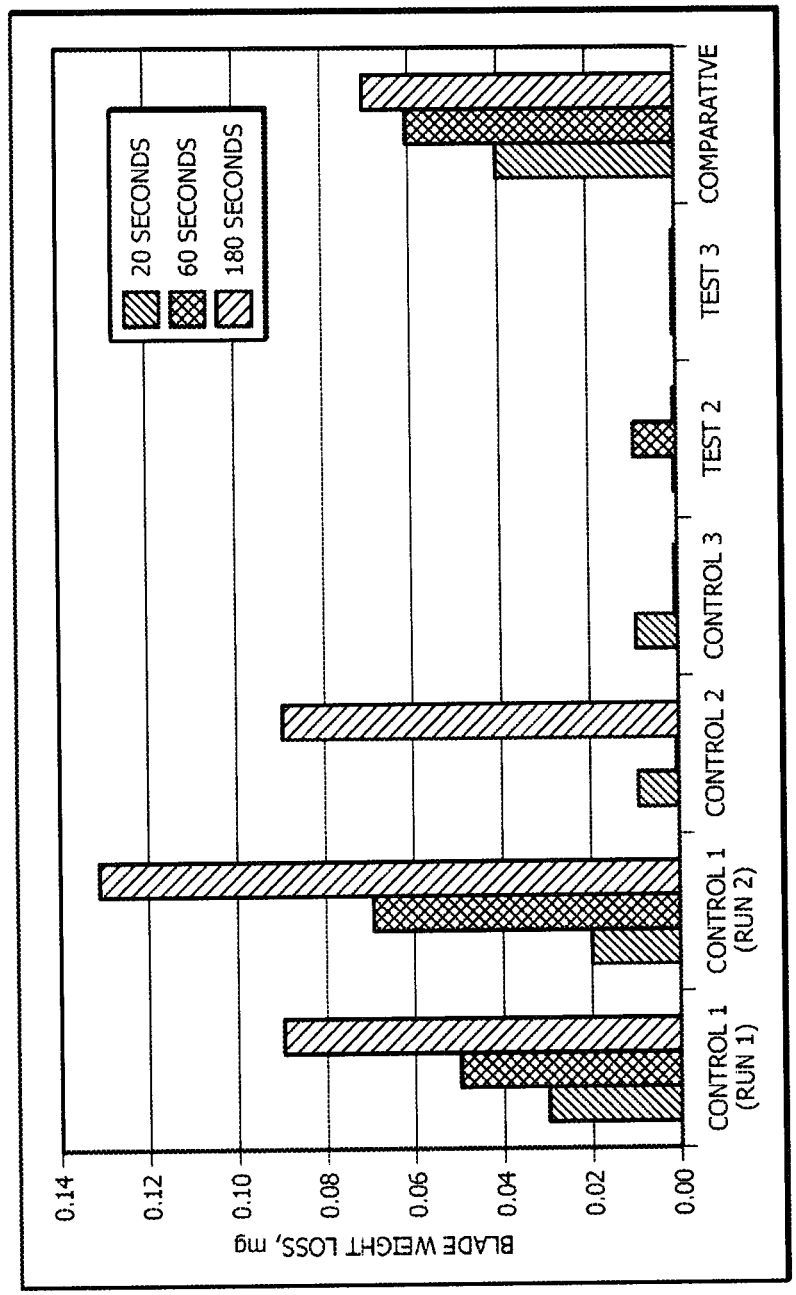
FIG. 7 is a graph illustrating data from erosion testing of certain treatment fluids of Example 2, including treatment fluids according to certain embodiments of the present disclosure.

Each of the samples above was blended in the Waring blender for 20, 60, and 180 second at 3,000 rpm using a flat metal blade of a known mass. (The Control #1 sample was run twice, and labeled Control 1 Run 1 and Control 1 Run 2 in FIG. 7.) Each blade was weighed before and after blending to determine its decrease in mass during the blending process. The amounts of the decreases in the mass of each blade after blending each sample are shown in FIG. 7. As demonstrated by this data, while the presence of the hydratable polymer dispersed in the fluid reduced the erosion of the blender blade to some degree, dry coating the hydratable polymer onto the sand as per this disclosure reduced the erosion of the blender blade even further, even using smaller amounts of the hydratable polymer. This data also demonstrates that at least the polymeric coating of SandWedge® NT tested in this example did not reduce erosion of the blade to the extent accomplished by the hydratable polymer coatings of the present disclosure.

ADDITIONAL DISCLOSURE

The following are non-limiting, specific embodiments in accordance with the present disclosure:

Embodiment A: A method comprising: conveying a plurality of proppant particulates into a blender; contacting a plurality of proppant particulates with an aqueous liquid concentrate comprising a hydratable polymer to at least partially coat one or more of the proppant particulates with the hydratable polymer, thereby forming coated proppant particulates; blending the plurality of proppant particulates comprising the coated proppant particulates with an aqueous base fluid in the blender to form a treatment fluid, the treatment fluid having a viscosity of about 25 cP or less; and introducing the treatment fluid from the blender into at least a portion of a subterranean formation.

Embodiment B: A method comprising: introducing an aqueous fracturing fluid into a well bore penetrating at least a portion of a subterranean formation at or above a pressure sufficient to create or enhance at least one fracture in the subterranean formation, the aqueous fracturing fluid having a viscosity of about 25 cP or less; conveying a plurality of proppant particulates from a storage container into a blender at a job site where the well bore is located; contacting the plurality of proppant particulates with an aqueous liquid concentrate comprising a hydratable polymer to at least partially coat a portion of the proppant particulates with the hydratable polymer; blending the plurality of proppant particulates comprising the coated proppant particulates with an aqueous base fluid in the blender to form a treatment fluid, the treatment fluid having a viscosity of about 25 cP or less; and introducing the treatment fluid from the blender into the well bore.

Embodiment C: A method comprising: introducing an aqueous fracturing fluid into a well bore penetrating at least a portion of a subterranean formation at or above a pressure sufficient to create or enhance at least one fracture in the subterranean formation, the aqueous fracturing fluid having a viscosity of about 25 cP or less; using an auger, a sand screw, or a combination thereof to convey a plurality of proppant particulates from a storage container into a blender at a job site where the well bore is located; contacting the plurality of proppant particulates with a functionalizing agent, and contacting the plurality of proppant particulates with an aqueous liquid concentrate comprising a hydratable polymer to at least partially coat a portion of the proppant particulates with the hydratable polymer, thereby forming coated proppant particulates; blending the plurality of proppant particulates comprising the coated proppant particulates with an aqueous base fluid in the blender to form a treatment fluid, the treatment fluid having a viscosity of about 25 cP or less; and introducing the treatment fluid from the blender into the well bore.

Embodiment D: A method comprising: conveying a plurality of coated proppant particulates into a blender, wherein the coated proppant particulates comprise at least a partial coating of dry friction reducer (DFR) and/or a hydratable polymer; blending the plurality of coated proppant particulates with an aqueous base fluid in the blender to form a treatment fluid; and introducing the treatment fluid from the blender into at least a portion of a subterranean formation.

Embodiment E: The method of Embodiment D further comprising forming the coated proppant particulates by: contacting a plurality of proppant particulates with an aqueous liquid concentrate comprising a hydratable polymer to at least partially coat one or more of the plurality of proppant particulates with the hydratable polymer.

Embodiment F: The method of Embodiment E wherein forming the coated proppant particulates further comprises: mixing the DFR with a plurality of particulates of the proppant to form a solids mixture and combining the solids mixture with an amount of water to form the coated proppant particulates comprising the at least the partial coating of the DFR; or wetting a plurality of particulates of the proppant with an amount of water to form a wetted proppant and combining the wetted proppant with the DFR to form the coated proppant particulates comprising the at least the partial coating of the DFR.

Embodiment G: The method of Embodiment E or Embodiment F further comprising: while conveying the plurality of coated proppant particulates into the blender, contacting the plurality of proppant particulates with a functionalizing agent before contacting the plurality of proppant particulates with the aqueous liquid concentrate comprising the hydratable polymer.

Embodiment H: The method of Embodiment G, wherein the functionalizing agent comprises an organosilane.

Embodiment I: The method of Embodiment E or Embodiment F, wherein contacting the plurality of proppant particulates with the aqueous liquid concentrate comprises spraying the aqueous liquid concentrate into the plurality of proppant particulates as the proppant particulates are dispensed from a storage container.

Embodiment J: The method of any of Embodiment A through Embodiment I: wherein the subterranean formation includes at least one fracture.

Embodiment K: The method of any of Embodiment A through Embodiment J, wherein the treatment fluid is introduced into at least a portion of the subterranean formation using one or more pumps.

Embodiment L: The method of any of Embodiment A through Embodiment K further comprising, after introducing the treatment fluid into at least a portion of the subterranean formation: allowing at least a portion of the hydratable polymer and/or DFR of the coated proppant particulates to detach from the proppant particulates and disperse into the treatment fluid.

Embodiment M: The method of any of Embodiment A through Embodiment L further comprising depositing at least a portion of the plurality of proppant particulates in at least one fracture of the subterranean formation.

Embodiment N: The method of any of Embodiment A through Embodiment M, wherein the viscosity of the treatment fluid is less than about 25, 20, 15, 10, 9, 8, 7, 6, 5, 4, or 3 cP, or in a range of from about 3 cP to about 20 cP, from about 3 cP to about 10 cP, or from about 3 cP to about 5 cP.

Embodiment O: The method of any of Embodiment A through Embodiment N, wherein the plurality of coated proppant particulates are conveyed into the blender using an auger, a sand screw, or both.

Embodiment P: The method of any of Embodiment A through Embodiment O further comprising blending a breaker additive with the aqueous base fluid and the plurality of coated proppant particulates in the blender to form the treatment fluid.

Embodiment Q: The method of any of Embodiment A through Embodiment P, wherein the hydratable polymer and/or the DFR comprises at least two monomeric units selected from the group consisting of: acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, an acrylic acid ester, a methacrylic acid ester, guar-based polymers, synthetic polymers, biopolymers, and any combination thereof.

Embodiment R: A method comprising: introducing an aqueous fracturing fluid into a well bore penetrating at least a portion of a subterranean formation at or above a pressure sufficient to create or enhance at least one fracture in the subterranean formation, the aqueous fracturing fluid having a viscosity of about 25 cP or less; conveying a plurality of proppant particulates from a storage container into a blender; contacting the plurality of proppant particulates with DFR and/or with an aqueous liquid concentrate comprising a hydratable polymer to at least partially coat a portion of the proppant particulates with the DFR and/or with the hydratable polymer, thereby forming coated proppant particulates; blending the plurality of proppant particulates comprising the coated proppant particulates with an aqueous base fluid in the blender to form a treatment fluid; and introducing the treatment fluid from the blender into the well bore.

Embodiment S: The method of Embodiment R further comprising, after introducing the treatment fluid into the well bore: allowing at least a portion of the DFR and/or the hydratable polymer of the coated proppant particulates to detach from the proppant particulates and disperse into the treatment fluid.

Embodiment T: The method of Embodiment R or Embodiment S further comprising depositing at least a portion of the plurality of proppant particulates in at least one fracture in the subterranean formation.

Embodiment U: The method of any of Embodiment R through Embodiment T, wherein the plurality of proppant particulate are conveyed into the blender using an auger, a sand screw, or both.

Embodiment V: The method of any of Embodiment R through Embodiment U, wherein the treatment fluid has a viscosity of about 25 cP or less.

Embodiment W: The method of any previous Embodiment further comprising depositing at least a portion of the plurality of proppant particulates in the at least one fracture.

Embodiment X: The method of any previous Embodiment further comprising blending a breaker additive with the aqueous base fluid and the plurality of proppant particulates (e.g., coated proppant particulates) in the blender to form the treatment fluid.

Embodiment Y: A method of mitigating erosion of fracturing equipment during a fracturing treatment, the method comprising: forming a plurality of coated proppant particulates having at least a partial coating of a dry friction reducer (DFR) and/or a hydratable polymer on a proppant; blending the plurality of coated proppant particulates with an aqueous base fluid in the blender to form a treatment fluid, whereby the at least the partial coating hydrates and swells to form a swelled coating which mitigates a striking impact of the proppant on downstream fracturing equipment; injecting the treatment fluid downhole via the fracturing equipment whereby the proppant is placed in fractures created by the injection of a fracturing fluid.

Embodiment Z1: The method of Embodiment Y, wherein forming the plurality of coated proppant particulates further comprises: combining the DFR with a plurality of particulates of the proppant to form a solids mixture and mixing the solids mixture with an amount of water to form the coated proppant particulates comprising the at least the partial coating of the DFR on the proppant.

Embodiment Z2: The method of Embodiment Z1, wherein mixing the solids mixture with the amount of water comprises combining the solids mixture with the amount of water to provide a wetted solids mixture and passing the wetted solids mixture through an auger.

Embodiment Z3: The method of Embodiment Y, wherein forming the plurality of coated proppant particulates further comprises: contacting a plurality of particulates of the proppant with an aqueous liquid concentrate comprising a hydratable polymer to at least partially coat one or more of the plurality of particulates of the proppant with the hydratable polymer, thereby forming the coated proppant particulates.

Embodiment Z4: The method of Embodiment Y, wherein forming the plurality of coated proppant particulates further comprises wetting the plurality of particulates of the proppant with an amount of water to form a wetted proppant and mixing the wetted proppant with the DFR to form the coated proppant particulates comprising the at least the partial coating of the DFR on the proppant.

Embodiment Z5: The method of Embodiment Z4, wherein mixing the wetted proppant with the DFR comprises combining the wetted proppant with the DFR to provide a wetted solids mixture and passing the wetted solids mixture through an auger.

Embodiment Z6: The method of any of Embodiment Z1, Z2, Z4, or Z5, wherein the amount of water comprises less than about 0.1, 0.2, 0.3, 0.4, 0.5, 1, 2, or 3 wt % of the coated proppant particulates.

Embodiment Z7: A method of mitigating erosion of fracturing equipment during a fracturing treatment, the method comprising: adding a solids-free fracturing fluid into the wellbore at an injection rate for generating a treating pressure above a fracture gradient to create one or more fractures in the subterranean formation; adding, via fracturing equipment, a treatment fluid into the wellbore to place the proppant into the one or more fractures, wherein the treatment fluid is prepared by: forming a coated proppant by: (i) combining a plurality of particulates of the proppant with a dry friction reducer (DFR) and an amount of water to at least partially coat one or more of the plurality of particulates of the proppant with the DFR, or (ii) contacting a plurality of particulates of the proppant with an aqueous liquid concentrate comprising a hydratable polymer to at least partially coat one or more of the plurality of proppant particulates with the hydratable polymer; blending the coated proppant with an aqueous-based fluid to form the treatment fluid for adding into the wellbore, whereby the coated proppant hydrates with water, thus swelling to provide a swelled coating that mitigates a striking impact of the proppant on the fracturing equipment during the adding, via the fracturing equipment, of the treatment into the wellbore to place the proppant into the one or more fractures.

Embodiment Z8: The method of Embodiment Z7 comprising (i), wherein forming the coated proppant comprises passing the proppant, the DFR, and the amount of water through an auger.

Embodiment Z9: The method of Embodiment Z8, wherein the amount of water comprises less than about 0.1, 0.2, 0.3, 0.4, 0.5, 1, 2, or 3 wt % of the coated proppant.

Embodiment Z10: A system for mitigating erosion of fracturing equipment during a fracturing treatment, the system comprising: a proppant hopper configured for holding a proppant, a wetted proppant comprising a proppant wetted by an amount of water and/or a solids mixture comprising a proppant and a dry friction reducer (DFR); a sprayer operable to spray an aqueous liquid concentrate comprising a hydratable polymer onto the proppant from the proppant hopper, to spray water onto the solids mixture from the proppant hopper, or to spray DFR onto the wetted proppant from the proppant hopper to provide a wetted solids mixture; an auger connected with the proppant hopper and with a slurry blender and operable to mix the wetted solids mixture via screw action of the auger to provide a coated proppant, and introduce the coated proppant into the slurry blender, wherein the coated proppant comprises at least a partial coating of the DFR and/or the hydratable polymer on the proppant; the slurry blender, wherein the slurry blender is downstream from the proppant hopper and configured to blend the coated proppant and an aqueous based fluid to provide a treatment fluid; fracturing equipment downstream from the slurry blender, and operable to inject the treatment fluid into a wellbore, wherein the at least the partial coating of the DFR and/or the hydratable polymer of the coated proppant hydrates in the slurry blender, thus swelling to provide a swelled coating that mitigates a striking impact of the proppant on the fracturing equipment during the fracturing treatment.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
    conveying a plurality of proppant particulates into a blender at a job site;
    while conveying the plurality of proppant particulates into the blender, contacting a plurality of proppant particulates with an aqueous liquid concentrate comprising a hydratable polymer to at least partially coat one or more of the proppant particulates with the hydratable polymer, thereby forming coated proppant particulates;
    blending the plurality of proppant particulates comprising the coated proppant particulates with an aqueous base fluid in the blender to form a treatment fluid, the treatment fluid having a viscosity of about 25 cP or less; and
    introducing the treatment fluid from the blender into at least a portion of a subterranean formation that includes at least one fracture,
    such that the coated proppant particulates are formed on-the-fly during the conveying and immediately utilized to form the treatment fluid in the blending step.

2. The method of claim 1 wherein the treatment fluid is introduced into a well bore at the job site that penetrates at least a portion of the subterranean formation.

3. The method of claim 1 wherein the treatment fluid is introduced into at least a portion of the subterranean formation using one or more pumps.

4. The method of claim 1 further comprising, after the step of introducing the treatment fluid into at least a portion of the subterranean formation:
    allowing at least a portion of the hydratable polymer on the coated proppant particulates to detach from the proppant particulates and disperse into the treatment fluid.

5. The method of claim 1 further comprising depositing at least a portion of the plurality of proppant particulates in the at least one fracture.

6. The method of claim 1 wherein the viscosity of the treatment fluid is less than about 10 cP.

7. The method of claim 1 wherein the viscosity of the treatment fluid is from about 3 cP to about 5 cP.

8. The method of claim 1 further comprising: while conveying the plurality of proppant particulates into the blender, contacting the plurality of proppant particulates with a functionalizing agent before the step of contacting the plurality of proppant particulates with the aqueous liquid concentrate comprising the hydratable polymer.

9. The method of claim 8 wherein the functionalizing agent comprises an organosilane.

10. The method of claim 1 wherein the plurality of proppant particulate are conveyed into the blender using an auger, a sand screw, or both.

11. The method of claim 1 wherein contacting the plurality of proppant particulates with the aqueous liquid concentrate comprising the hydratable polymer comprises spraying the aqueous liquid concentrate into the plurality of proppant particulates as the proppant particulates are dispensed from a storage container.

12. The method of claim 1 further comprising blending a breaker additive with the aqueous base fluid and the plurality of proppant particulates in the blender to form the treatment fluid.

13. The method of claim 1 wherein the hydratable polymer comprises at least two monomeric units selected from the group consisting of: acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, an acrylic acid ester, a methacrylic acid ester, and any combination thereof.

14. A method comprising:
    introducing an aqueous fracturing fluid into a well bore penetrating at least a portion of a subterranean formation at or above a pressure sufficient to create or enhance at least one fracture in the subterranean formation, the aqueous fracturing fluid having a viscosity of about 25 cP or less;
    conveying a plurality of proppant particulates from a storage container into a blender at a job site where the well bore is located;
    while conveying the plurality of proppant particulates into the blender, contacting the plurality of proppant particulates with an aqueous liquid concentrate comprising a hydratable polymer to at least partially coat a portion of the proppant particulates with the hydratable polymer, thereby forming coated proppant particulates;
    blending the plurality of proppant particulates comprising the coated proppant particulates with an aqueous base fluid in the blender to form a treatment fluid, the treatment fluid having a viscosity of about 25 cP or less; and
    introducing the treatment fluid from the blender into the well bore,
    such that the coated proppant particulates are formed on-the-fly during the conveying and immediately utilized to form the treatment fluid in the blending step.

15. The method of claim 14 further comprising, after the step of introducing the treatment fluid into the well bore:

allowing at least a portion of them the hydratable polymer on the coated proppant particulates to detach from the proppant particulates and disperse into the treatment fluid.

16. The method of claim 14 further comprising depositing at least a portion of the plurality of proppant particulates in at least one fracture in the subterranean formation.

17. The method of claim 14 wherein the plurality of proppant particulate are conveyed into the blender using an auger, a sand screw, or both.

18. A method comprising:
introducing an aqueous fracturing fluid into a well bore penetrating at least a portion of a subterranean formation at or above a pressure sufficient to create or enhance at least one fracture in the subterranean formation, the aqueous fracturing fluid having a viscosity of about 25 cP or less;
using an auger, a sand screw, or a combination thereof to convey a plurality of proppant particulates from a storage container into a blender at a job site where the well bore is located;
while conveying the plurality of proppant particulates into the blender,
contacting the plurality of proppant particulates with a functionalizing agent, and
contacting the plurality of proppant particulates with an aqueous liquid concentrate comprising a hydratable polymer to at least partially coat a portion of the proppant particulates with the hydratable polymer, thereby forming coated proppant particulates;
blending the plurality of proppant particulates comprising the coated proppant particulates with an aqueous base fluid in the blender to form a treatment fluid, the treatment fluid having a viscosity of about 25 cP or less; and
introducing the treatment fluid from the blender into the well bore,
such that the coated proppant particulates are formed on-the-fly during the conveying and immediately utilized to form the treatment fluid in the blending step.

19. The method of claim 18 further comprising depositing at least a portion of the plurality of proppant particulates in the at least one fracture.

20. The method of claim 18 further comprising blending a breaker additive with the aqueous base fluid and the plurality of proppant particulates in the blender to form the treatment fluid.

* * * * *

UNITED STATES PATENT AND TRADEMARK OFFICE
CERTIFICATE OF CORRECTION

PATENT NO.         : 10,988,683 B2
APPLICATION NO.    : 16/933346
DATED              : April 27, 2021
INVENTOR(S)        : Phillip D. Nguyen, Janette Cortez Montalvo and Jun Su An Page 1 of 1

It is certified that error appears in the above-identified patent and that said Letters Patent is hereby corrected as shown below:

On the Title Page

(73) Assignee, replace "Halliburton Energy Sendees, Inc." with -- Halliburton Energy Services, Inc. --.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*